US009296096B2

(12) United States Patent
Pecherzewski

(10) Patent No.: US 9,296,096 B2
(45) Date of Patent: Mar. 29, 2016

(54) IMPELLER PULLER

(71) Applicant: Andrzej Pecherzewski, Culver City, CA (US)

(72) Inventor: Andrzej Pecherzewski, Culver City, CA (US)

( * ) Notice: Subject to any disclaimer, the term of this patent is extended or adjusted under 35 U.S.C. 154(b) by 368 days.

(21) Appl. No.: 13/898,405

(22) Filed: May 20, 2013

(65) Prior Publication Data

US 2014/0157562 A1 Jun. 12, 2014

Related U.S. Application Data

(60) Provisional application No. 61/649,206, filed on May 18, 2012.

(51) Int. Cl.
*B23Q 1/00* (2006.01)
*B25B 27/02* (2006.01)
*B25B 5/04* (2006.01)

(52) U.S. Cl.
CPC . *B25B 27/02* (2013.01); *B25B 5/04* (2013.01); *Y10T 29/53991* (2015.01)

(58) Field of Classification Search
USPC ............................................................ 29/283
See application file for complete search history.

(56) References Cited

U.S. PATENT DOCUMENTS

| | | | | |
|---|---|---|---|---|
| 1,174,964 | A * | 3/1916 | Bradley | 5/119 |
| 1,433,153 | A * | 10/1922 | Robinson | 81/131 |
| 2,662,432 | A * | 12/1953 | Peitl | 269/239 |
| 4,761,869 | A * | 8/1988 | Barry et al. | 29/261 |
| 5,092,427 | A * | 3/1992 | MacMillan | 182/20 |
| 5,261,149 | A * | 11/1993 | Sutton | 29/261 |
| 5,809,623 | A * | 9/1998 | Dykstra | 24/514 |
| 7,886,872 | B2 * | 2/2011 | Astor et al. | 182/129 |
| 8,464,411 | B2 * | 6/2013 | Betcher et al. | 29/259 |
| 2010/0258772 | A1 * | 10/2010 | Parkin | 254/29 A |
| 2012/0102704 | A1 * | 5/2012 | Barrios et al. | 29/426.5 |
| 2014/0239570 | A1 * | 8/2014 | Chu | 269/165 |

* cited by examiner

*Primary Examiner* — Lee D Wilson
*Assistant Examiner* — Alvin Grant
(74) *Attorney, Agent, or Firm* — Marvin H. Kleinberg; Kleinberg & Lerner, LLP

(57) ABSTRACT

An impeller remover with four main components: two legs, a leg holder and a latch. The latch has a locking notch that engages with a locking bolt on one leg to hold the legs parallel when removing an impeller. The impeller remover removes impellers quickly, easily, and without damage to the impeller or pump. In addition, the impeller remover is easy to use and repair, and relatively inexpensive to replace and fabricate.

5 Claims, 4 Drawing Sheets

FIG. 3
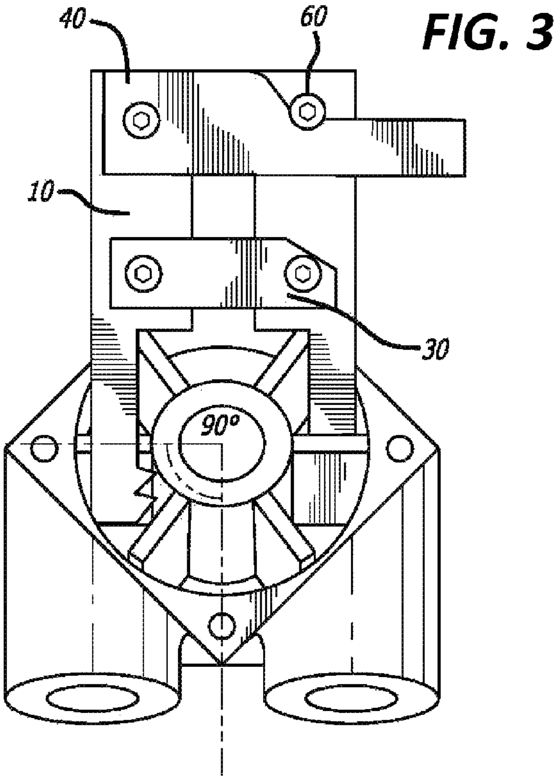
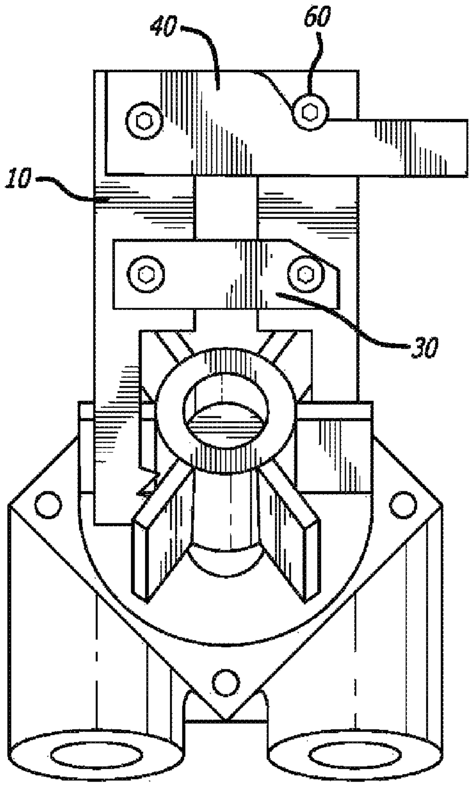
FIG. 4

IMPELLER PULLER

CROSS REFERENCE TO RELATED APPLICATIONS

The present application claims priority to U.S. Provisional Patent Application No. 61/649,206, filed May 18, 2012, the entirety of which is hereby incorporated by reference for all purposes.

BACKGROUND

1. Field of the Invention

The present invention related to an impeller puller adapted to facilitate the removal of impellers from the body or housing of various liquid pumps.

2. Background of the Invention

Impellers are used in various types of liquid pumps. Various removal tools have been devised to aid in the removal of impellers from liquid pumps for repair or replacement. These tools generally share the common goal of making it easier to remove the impeller without requiring the disassembly of the entire pump. An additional goal of prior art impeller removal tools was to remove the impeller without damaging it. An ideal removal tool would also be simple and easy to use, capable of safely removing an impeller quickly, and easy to repair. The present invention accomplishes all of these goals because it is effective at quickly removing impellers without damage, while reducing the parts of the tool from those of the prior art in order to improve ease of use, maintenance and reparability.

BRIEF SUMMARY OF THE INVENTION

The present invention is directed towards an impeller puller adapted to be used to remove impellers from a pump cavity within a liquid pump. The invention includes 4 main components connected, in a preferred embodiment, by nuts and bolts. Other well known fasteners in the art may also be used. The invention is composed of two legs. Each leg has a series of notches towards the bottom of the leg. The legs are arranged so that the notches face each other. When the invention is in use the notches engage with the impeller and allow the impeller to be pulled out of the pump cavity.

The third main component is a leg holder that is, in a preferred embodiment, attached approximately halfway up the legs. The leg holder restricts the legs movements relative to each other, such that the legs are always held in the same plane. The fourth main component is the latch. The latch is attached to one leg at the opposite end of the leg from the notches. The latch is not attached to the other leg, but does include a notch that is disposed so that a bolt on the unattached leg can rest in the notch. When the bolt of the unattached leg rests in the notch on the latch the legs are held parallel to each other. The width of the latch is reduced past the notch so that the legs may be pushed apart at the top, thereby bringing the notches at the bottom closer together to engage with impellers of a smaller width.

In an alternative embodiment, the legs have hooks at their ends so that the invention and impeller can be withdrawn by the hooks instead of by pulling on the latch.

BRIEF DESCRIPTION OF THE DRAWINGS

FIG. 3 illustrates how the invention engages with a typical liquid pump.

FIG. 4 illustrates the invention engaging with an impeller in a typical liquid pump.

DETAILED DESCRIPTION OF THE INVENTION

In the following description of the preferred embodiment, reference is made to the accompanying drawings that form a part hereof, and in which is shown by way of illustration a specific embodiment in which the invention may be practiced. It is to be understood that other embodiments may be utilized and changes may be made without departing from the scope of the present invention.

Figure 1:
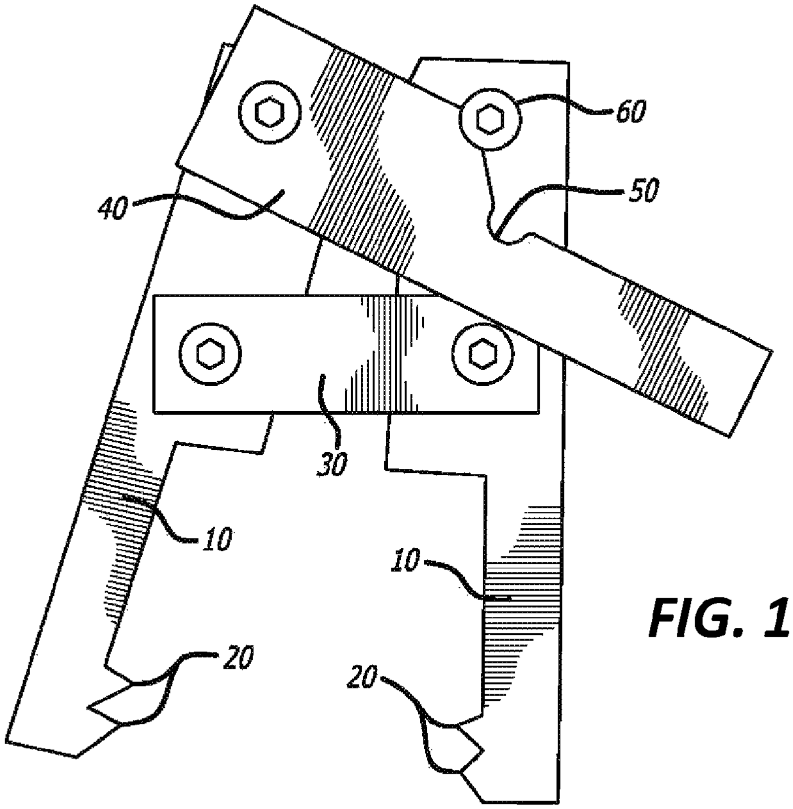
FIG. 1 illustrates the components of the present invention.

FIG. 1 illustrates the present invention. The invention includes 4 main components connected, in a preferred embodiment, by nuts and bolts. Other well known fasteners in the art may also be used. The invention is composed of two legs 10. Each leg 10 has a series of notches 20 towards the bottom of the leg 10. The legs 10 are arranged so that the notches 20 face each other. When the invention is in use the notches 20 engage with the impeller and allow the impeller to be pulled out of the pump cavity.

The third main component is a legs holder 30 that is, in a preferred embodiment, attached approximately halfway up the legs 10. The legs holder 30 restricts the legs 10 movements relative to each other, such that the legs 10 are always held in the same plane. The fourth main component is the latch 40. The latch 40 is attached to one leg 10 at the opposite end of the leg 10 from the notches 20. The latch 30 is not attached to the other leg 10, but does include a locking notch 50 that is disposed so that a locking bolt 60 on the unattached leg 10 can rest in the locking notch 50. When the locking bolt 60 of the unattached leg 10 rests in the locking notch 50 on the latch 40 the legs 10 are held parallel to each other. The width of the latch 40 is reduced past the locking notch 50 so that the legs 10 may be pushed apart at the top, thereby bringing the notches 20 at the bottom of the legs 10 closer together to engage with impellers of a smaller width.

Figure 2:
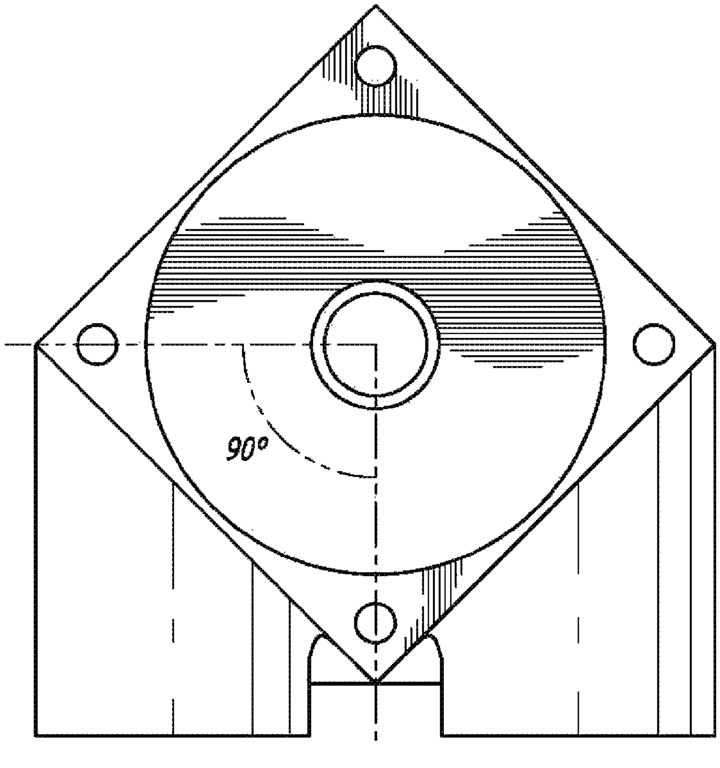
FIG. 2 illustrates a typical cavity liquid pump.

FIG. 2 illustrates a first step in a preferred method for using the present invention. The present invention is inserted into the cavity of a liquid pump at a 90° angle relative to the cam bolt.

FIG. 3 illustrates a second step in the preferred method for using the present invention. In this illustration, the present invention has been inserted into the liquid pump with its legs 10 spread apart to reach the appropriate depth in the liquid pump. Next, as shown in the illustration, the locking bolt 60 is engaged with the locking notch 50 which brings the legs 10 into a parallel position.

Figure 5:
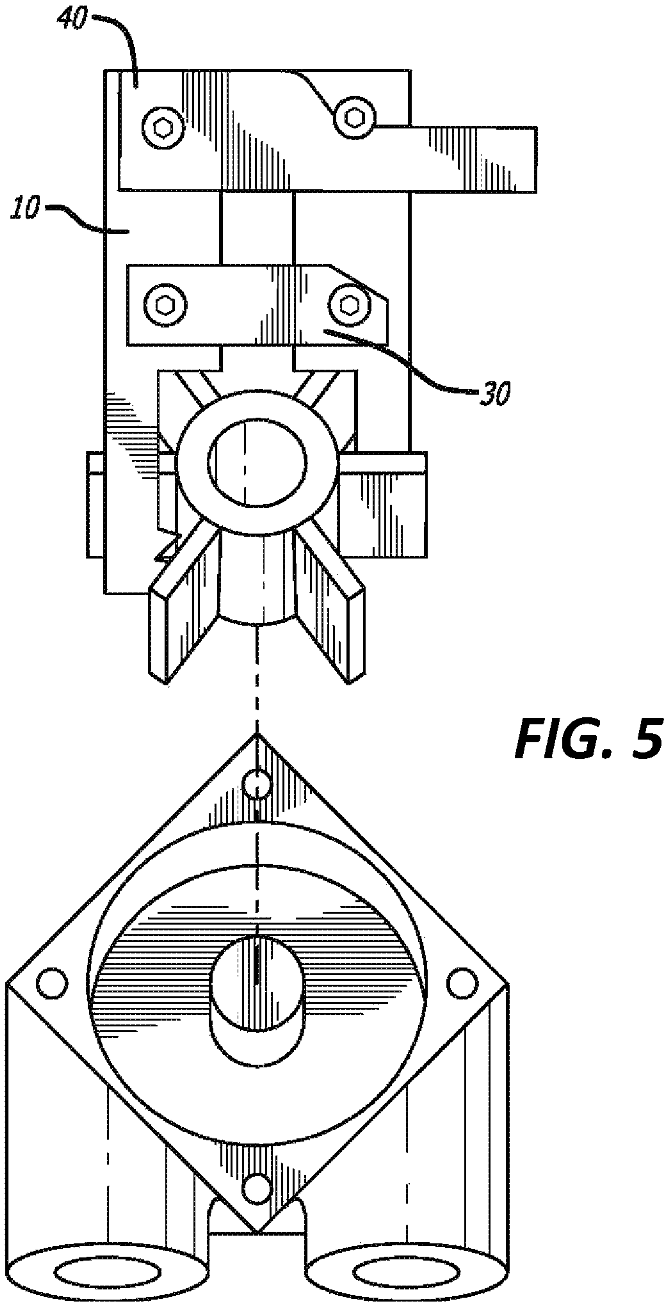
FIG. 5 illustrates the invention in use to remove an impeller from a typical liquid pump.

FIG. 5 illustrates the same step as FIG. 3 but with an impeller in the liquid pump. In this illustration the locking bolt 60 is in the locking notch 50 to bring the legs 10 into parallel position and engage the notches 20 (not shown in this illustration) with the impeller.

Figure 6:
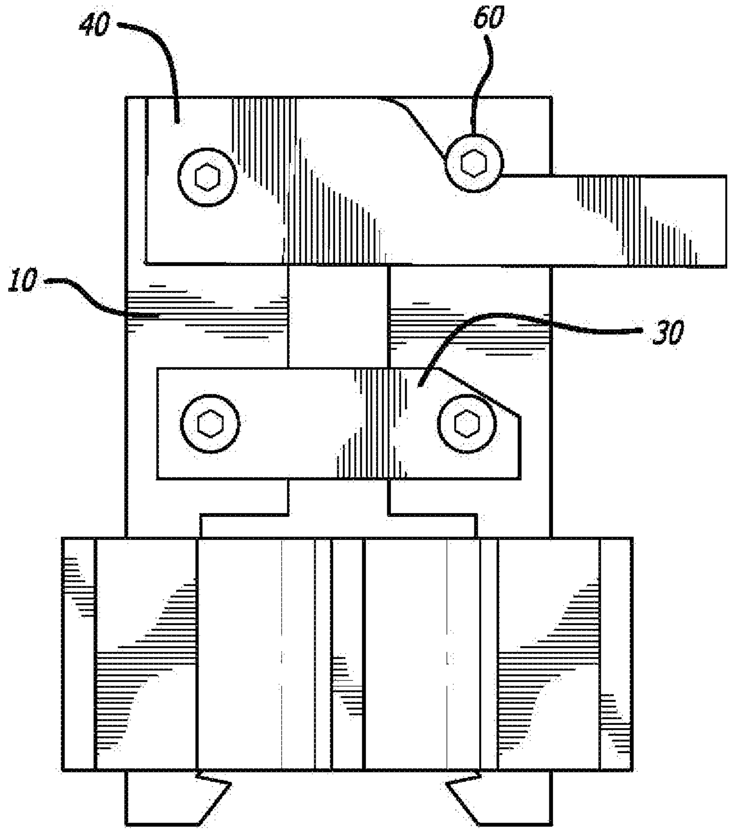
FIG. 6 illustrates the invention gripping an impeller with a pen for scale.

FIG. 6 illustrates the next step of the process. The present invention and the impeller are withdrawn by grasping the invention by the latch 40 and lifting the invention. The notches 20 engage with the impellar and lift the impeller out of the liquid pump without damaging the pump or impeller.

FIG. 7 illustrates one embodiment of the invention engaged with an impeller and with a pen in the foreground for scale. Other sized embodiments are within the scope of the present invention, because the present invention can be adapted for very large or very small impellers by merely scaling the invention to a larger or smaller size, respectively.

What is claimed is:

1. An impeller remover with two legs, said legs having at least one notch at a proximal end of each of said legs; wherein a latch is fastened to a first of said legs at a distal end of said first leg;

said latch being able to rotate about said fastener attaching said latch to said first leg;

a locking bolt fastened to a second of said legs at the distal end of said second leg;

said latch having a locking notch and said locking notch and said locking bolt being capable of engaging such that said legs are held parallel to each other.

2. The impeller remover of claim 1, wherein said latch is of one width proximate to said first leg and of a second, decreased width distally from said locking notch such that said second leg may be pushed away from said first leg at the distal ends of said legs, thereby decreasing the distance between said notches.

3. The impeller remover of claim 2, wherein the length of said latch distal to said locking notch being of sufficient length such that said latch remains in contact with said locking bolt when said legs are pushed away from each other at the distal ends of said legs.

4. An impeller remover with two legs, said legs having at least one notch at a proximal end of each of said legs;

a legs holder fastened to said legs at approximately the midpoint of said legs;

a latch fastened to a first of said legs at a distal end of said first leg;

said latch being able to rotate about said fastener attaching said latch to said first leg;

a locking bolt fastened to a second of said legs at the distal end of said second leg;

said latch having a locking notch and said locking notch and said locking bolt being capable of engaging such that said legs are held parallel to each other;

said latch being of one width proximate to said first leg and of a second, decreased width distally from said locking notch such that said second leg may be pushed away from said first leg at the distal ends of said legs, thereby decreasing the distance between said notches;

and the length of said latch distal to said locking notch being of sufficient length such that said latch remains in contact with said locking bolt when said legs are pushed away from each other at the distal ends of said legs.

5. An impeller remover with two legs, said legs having at least one notch at a proximal end of each of said legs;

a means for widening and narrowing a distance of the proximal ends of the legs through the manipulation of a distal end of each leg by the user, including crossing the legs at a midpoint of a length of the leg and fastening the two midpoints together such that squeezing the distal ends of each leg together will subsequently force the proximal ends to squeeze together, producing a tight grip at the location of the notches.

* * * * *